United States Patent [19]
Kittler et al.

[11] 4,133,009
[45] Jan. 2, 1979

[54] COLOR VIDEO TAPE RECORDING/PLAYBACK SYSTEM

[75] Inventors: Wolfram Kittler; Gerhard Rotter, both of Ludwigshafen, Fed. Rep. of Germany

[73] Assignee: BASF Aktiengesellschaft, Rheinland/Pfalz, Fed. Rep. of Germany

[21] Appl. No.: 759,122

[22] Filed: Jan. 13, 1977

[30] Foreign Application Priority Data
Jan. 23, 1976 [DE] Fed. Rep. of Germany 2602420

[51] Int. Cl.² .................. H04N 5/785; G11B 15/00
[52] U.S. Cl. ........................................ 360/9; 360/33
[58] Field of Search ............. 360/9, 10, 11, 33, 36–37, 360/35

[56] References Cited
U.S. PATENT DOCUMENTS

| | | |
|---|---|---|
| 3,372,228 | 3/1968 | Law ................................ 360/9 X |
| 3,855,424 | 12/1974 | Tharmaratnam ................ 360/10 X |
| 3,891,977 | 6/1975 | Amelid et al. ................... 340/173 R |
| 4,001,885 | 1/1977 | Ikushima ........................ 360/9 X |

FOREIGN PATENT DOCUMENTS

| | | |
|---|---|---|
| 1214719 | 4/1966 | Fed. Rep. of Germany ............ 360/11 |
| 47-11927 | 4/1972 | Japan ........................................ 360/10 |

*Primary Examiner*—John H. Wolff
*Attorney, Agent, or Firm*—Keil, Thompson & Shurtleff

[57] ABSTRACT

A color video tape recording/playback system with a magnetic tape unit and possibly a color video camera comprises at least one signal storage means, e.g. a charge-coupled device (CCD), for the intermediate storage of the video information, thus enabling the recording to be carried out with a reduced bandwidth or at a reduced tape speed and, if applicable, with a reduction of time base errors. Skip line or skip field methods are used or the grouping of several lines is exploited. The reduction of time base errors during playback is achieved by clocking out the stored signal from the charge-coupled device at the rhythm of the tape speed fluctuations in the tape recorder.

16 Claims, 7 Drawing Figures

COLOR VIDEO TAPE RECORDING/PLAYBACK SYSTEM

This invention concerns a color video tape recording/playback system, in particular for color video signals, comprising a magnetic tape recorder and, for instance, a color video camera in which the signals enter at least one signal storage means prior to being recorded and clocked out from this intermediate store prior to playback.

In particular, the invention concerns systems in which only every $n^{th}$ line or field is recorded on magnetic tape and the recorded lines or fields to be played back are read out n times from the CCD.

It is known to record and play back color video signals by means of tape recorders for home use. It is also known to record only every $n^{th}$ field and to scan the recorded fields n times, in order to achieve n-fold reduction of tape consumption without reducing the bandwidth (e.g. German Pat. No. 1,214,719). Smaller tape rolls, which can be used here, result in smaller, and therefore less costly, drive units. The interlacing of the original video signal and the horizontal resolution remain substantially unchanged when this known recording method is employed, and the slight loss of vertical resolution is hardly noticed by the layman.

It is the main object of the invention to provide a simple recording/playback system for color video signals.

It is a further object of the invention to provide a recording/playback system for color video signals in which the above-described skip line or skip field recording/playback method can be utilized to particular advantage, in particular in tape recorders operating with a stationary magnetic head.

It is another object of the invention to keep the circuit arrangements for such a system as simple as possible.

According to the invention a color video signal recording/playback system of the type referred to in which only every $n^{th}$ field or line is recorded on magnetic tape and the recorded fields or lines are scanned n times at clock frequency for the purpose of playback is provided wherein, prior to recording, every $n^{th}$ line or field is entered into an electronic signal storage device at clock frequency during a period corresponding to line scan or field scan period and the lines or fields intermediate the nth lines or fields are skipped and the stored information is clocked out and then recorded at $1/n^{th}$ of the clock frequency.

In this way an essential advantage is gained, namely that the bandwidth required for recording the color video signals is reduced to 1 $n^{th}$ of the normally required bandwidth. It becomes possible either to use a tape system of very low bandwidth, as is the case, for example, in tape drive units operating at high tape transport speeds and with a stationary head such as a contact winding drive, or the relative speed of the tape and the magnetic head can be reduced to 1 $n^{th}$ of the speed normally required.

In an advantageous embodiment of the invention that part of the picture which is used for storage is either a horizontal line scan or a field scan.

According to a further embodiment of the invention, $n = 2$. In that case, if only every second line or field is recorded and reproduced twice, a picture will be obtained which is virtually unchanged as perceived by the human eye, although only half the bandwidth is required. For example, a video signal requiring a bandwidth of 3 MHz can now be recorded, and subsequently reproduced, with a recording system operating with a bandwidth of only 1.5 MHz or with only half of the normally required relative tape/head speed.

Even with n equalling 4, adequate picture quality can still be obtained.

An advantageous arrangement for carrying the system of the invention into practical effect which contain a tape recorder with at least one magnetic head for recording and, if desired, also, for playback, comprises essentially at least two clockable electronic storage devices, a control logic unit, switches, write and read circuits and a clock generator. In dependence on the signal sequence of the input video signal, the control logic unit connects the latter via the switches to the input of the first or the second signal storage means, e.g. a charge-coupled device, and feeds the output of the other signal storage means, e.g. a charge-coupled device, to which the video signal is not being applied at this time, via the third switch to the magnetic head of the tape recorder. During this process the video signal is entered in one of the storage means or charge-coupled devices and simultaneously derived from the other storage means or charge-coupled device via the write and read units at the clock frequency produced by the clock generator and at $1/n^{th}$ of this clock frequency, respectively.

The above applies for a number of n lines or fields. For example, for $n = 2$ the 1st, 3rd, 5th, etc., field is stored in which case the 2nd, 4th, 6th, etc., field is skipped by suitable switch control. Upon completion of the storage of the signal in the first storage means or charge-coupled device, the output of this first storage means or charge-coupled device is fed to the magnetic head of the tape recorder via a second switch, so that the previously stored $n^{th}$ field is derived at 1 $n^{th}$ of the clock frequency originating from the clock generator.

The main items in this arrangement are the clockable electronic storage devices which have meanwhile become commercially available under the designation "CCD" (Charge-Coupled Devices). These CCD's are elements, usually in matrix arrangement, for storing analog signals. They operate with low voltages and are made available in the form of integrated circuit (IC's). Storage essentially takes place according to the shift register principle, the charge shifts being accomplished by means of special write and read units. The capacity of these CCD's may go up to 500 horizontal elements and 300 to 500 vertical elements, yielding about 150,000 to 250,000 storage locations. By comparison, the normal television picture based on the CCIR standard comprises about 375,000 visible image elements in terms of the full bandwidth of 5.5 MHz, so that one field can be comfortably stored in a CCD array, notwithstanding the large bandwidth. A CCD array for storing a horizontal line has therefore also been technically feasible for some time and is commercially available for the purpose of low-cost applications.

The other parts of the system are commercially available which is why their construction and employment will not be discussed here in further detail.

A record/playback system for color video signals according to the invention in which only every $n^{th}$ line or field is recorded by means of the magnetic tape of a tape recorder and reproduced therefrom is also obtained if at least two clock-controlled electronic charge-coupled storage devices, a control logic unit, switches, write and read units operating at clock frequency and a clock generator are provided, the control logic unit connecting the input video signal, in dependence on the signal sequence, via the switches to the input of the first charge-coupled device and storing the $n^{th}$ line or field therein at the clock frequency produced by the clock generator, the storage of the intermediate lines or fields being skipped by switching and, immediately upon completion of storage in the first charge-coupled storage device, applying the output of this first charge-coupled storage device to the magnetic head of the recorder via a second switch and reading the previously stored $n^{th}$ line or field at 1 $n^{th}$ of the clock frequency produced by the clock generator.

According to the invention, this system may advantageously be provided with feedback loops on the signal storage devices, in order to achieve an automatic double readout of the stored video information.

This provides a very simple solution for repeating the signal.

According to the invention a repeat of the video signal contained in the charge-coupled storage devices may also be achieved by a third charge-coupled storage device with a direct output line and a switch for changing the signal path between one of the charge-coupled storage devices and the third charge-coupled storage device having the direct output line.

According to the invention, the playback system may advantageously comprise a phase-locked oscillator circuit capable of generating a faultless clock frequency with frequency re-adjustment.

Another variant of the system of the invention concerns a recording system for a color video camera in which a matrix-type charge-coupled storage device is provided for storing the image and converting it into electrical signals and which is provided with a tape recorder with a magnetic head serving at least for recording purposes wherein the video information contained in the charge-coupled storage device is read out at $1/N^{th}$ of the clock frequency prior to being recorded on tape, N being the factor by which the line storage capacity of the charge-coupled device falls below the standard number of lines of the color TV standard employed.

This makes it possible, for example, when utilizing the full picture capacity of the storage device (600 × 800 storage locations) to transmit the full video bandwidth of 5.5 MHz if, with N equalling 2, the video information is read out at half the clock frequency used for recording on the magnetic tape, always provided that, on reproduction, the record is read out twice at full clock frequency.

The storage device may also have $1/N^{th}$, i.e. half or preferably one third, of the full image storing capacity which would correspond to 300 × 800 or 200 × 800 storage locations. In this way, a very lowcost storage device could be obtained. "N" in this case is the number of combined lines, for example N = 2 at 300 lines, N = 3 at 200 lines, N = 4 at 150 lines etc., it being assumed that the standard is 600 lines. Further according to the invention it is an advantage if N = 3 and the recording speed of the magnetic tape amounts to one third of its normal speed. In the case of the initially mentioned recorder with a contact-winding mechanism and a stationary head, the normal speed amounts to 4 meters/s, so that a recording speed of 1.33 meters/s will be sufficient to recover the full 5.5 MHz resolution on reproduction if a storage device with 200 × 800 storage locations (grouping of every three successive horizontal lines) is used. By combining several lines of which each contains different video information nevertheless causes only the known information losses. In a recorder of the above-mentioned type, the energy requirement therefore drops to one third compared with the standard speed and, during the reversal at the end of the tape, drops to one ninth in accordance with the physical relationship regarding rotational energy because the angular velocity enters into the equation as a second-power magnitude, in addition to the moment of inertia which remains unchanged and enters into the equation only as a first-power magnitude.

Given equal power, the reversing time can be reduced to a ninth, or the energy requirement of a battery-driven camera with integrated drive mechanism can be reduced to one ninth which makes its operation very economic indeed.

According to the invention there is further provided a record/playback system for a color video camera in which the video signals are present at least for the duration of a horizontal line and become available in the shape of a color video picture composed of a number of lines reduced in comparison with the standard number of lines, the said color video picture being recorded/reproduced by means of a magnetic tape system in such a way that, prior to recording, every $n^{th}$ picture sample, following its entry into an electronic storage device at clock frequency, is stored at least for the duration of a horizontal line and the intermediate lines are skipped, the stored sample, after being read at 1 $n^{th}$ of the clock frequency, is recorded by the magnetic head of the magnetic tape system and the recorded sample is scanned n times for playback.

In such a system, the electronic storage device may have the capacity for storing of a field or, preferably, a single horizontal line.

Another advantageous feature of the invention is that the clocked readout of video information from the storage means, e.g. a charge-coupled device, takes place at $1/N^{th}$ of the clock frequency prior to recording, the said clock frequency being modified at the rhythm of the actual tape speed fluctuations of the recorder drive mechanism.

The ensuing advantages are in particular that clocked readout takes place with actual tape speed fluctuations being taken into account, so that any time base error correction circuit advantageous for playback may be limited to a minimum. Moreover, direct playback from the tape recorder (possibly integrated with the camera) on a monitor will be possible without too much distortion caused by time base errors.

Finally, between the tachogenerator of the drive mechanism and the clock generator for the signal storage device there is provided a control circuit, especially a phase-locked loop (PLL) which modifies the clock frequency at the rhythm of tape speed fluctuations.

Further details of the system can be gathered from an embodiment of the arrangement proposed by the invention, given by way of example described below and illustrated in the accompanying drawings. There are shown in FIG. 1 a block diagram of the recording circuit of the system FIG. 1a the original clock video signal FIG. 1b a color video signal as recorded according to the present invention FIG. 2 a block diagram of the playback circuit of the system FIG. 3 a diagram showing the voltages of the circuit of FIG. 1

Figures 1, 1B:
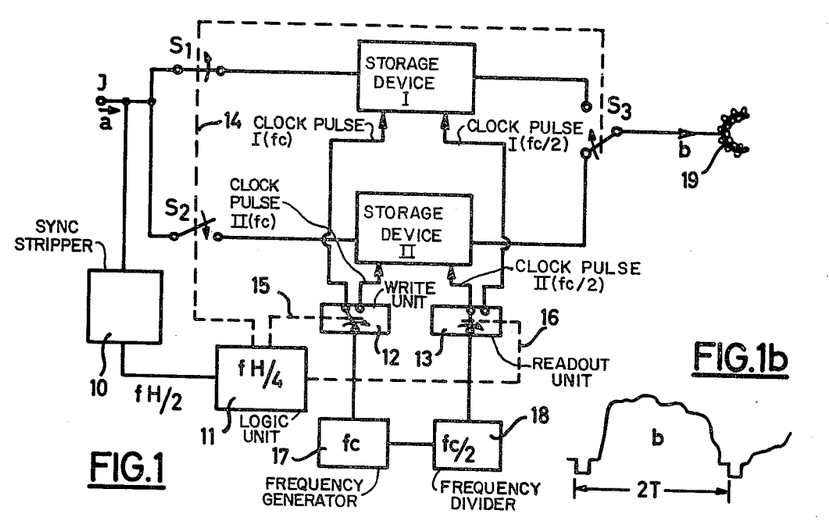

At the terminal J appears a complete but demodulated color video signal a which is also applied to the switches $S_1$ and $S_2$ and to the sync stripper 10. In the sync stripper 10 the line frequency $f_H$ and, through it, half the line frequency $f_{H/2}$ is derived from the horizontal sync pulses. Naturally, it would also be possible to derive the vertical frequency from the vertical sync pulses if the embodiment discussed here were to relate to the skip field method when fields are used as the samples to be stored. For simplicity's sake only horizontal line samples having a period of 62 μs and a horizontal frequency $f_H$ will be discussed. If the system is to operate with field samples, these concepts would have to be replaced by the field concept, the vertical period of 20 ms and the vertical frequency. Half the line frequency $f_{H/2}$ is fed to the logic circuit 11 and divided so as to obtain the frequency $f_{H/4}$ at which the switches $S_1$–$S_3$ and the write and readout units 12 and 13 — essentially electronic switches — are triggered so as to skip lines while recording them. The connections for triggering are indicated by dotted lines and denoted by the reference numerals 14–16. In practical terms they need not of course be electrical conductors. Whereas the switches $S_1$–$S_3$ are connected by the line 14, the lines 15 and 16 are taken from the logic unit to the write and readout units 12 and 13. The switches $S_1$ and $S_2$ connect the input video signal a to, or separate it from, the inputs of two charge-coupled devices I and II. These charge-coupled devices I and II must be capable of storing a horizontal line (64 μs) or a field (20 ms). The control logic unit may be a flip-flop and/or a diode circuit arrangement.

Figures 1A, 2:
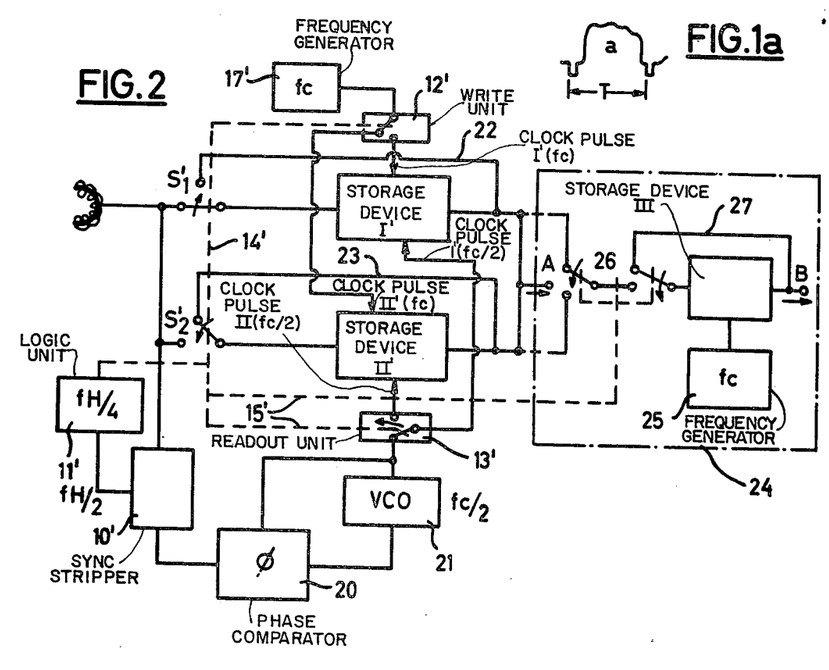
Figure 3:
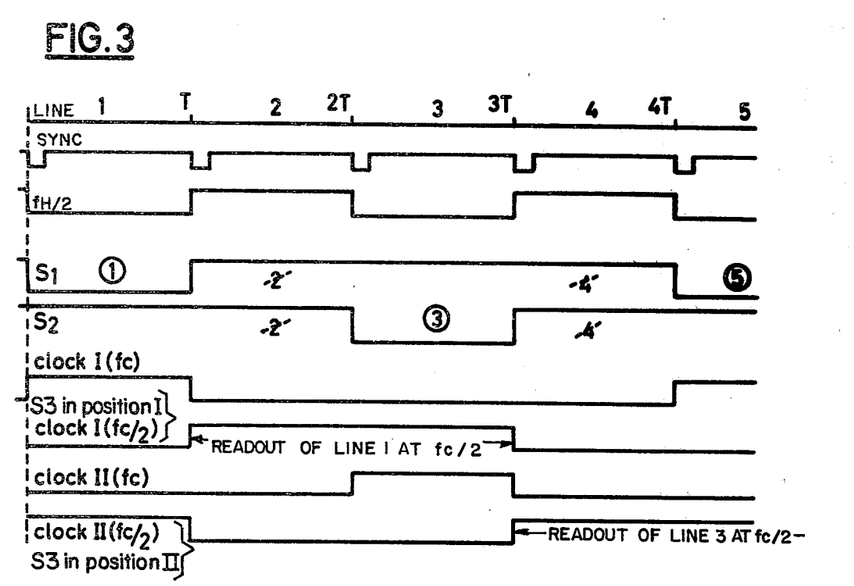

The storage device must be capable of coping with the required bandwidth, i.e. with 3 MHz, for example. Storage is accomplished by clocked insertion of analog-signal samples which, in the present case, is video information within a bandwidth of 3 MHz at a clock frequency $f_c$ of 6 MHz. As can be gathered from FIGS. 1 and 3, to record a line of video signals it is written into the charge-coupled storage device I when switch $S_1$ is closed, by clocked insertion via the write unit 12 to which the clock frequency $f_c$ is applied. Switch $S_2$ is open at this time, but owing to the coupled actuation of switches $S_1$, $S_2$ and of units 12 and 13 it is possible — as shown by the characteristic "clock II" in FIG. 3 — to clock out a video signal previously written into the store II and to apply it via switch $S_3$ to the recording head 19 of a tape recorder. This clocking-out process again takes place at $1/n^{th}$ of clock frequency $f_c$, in the present example at the clocking-out frequency $f_{c/2}$ which amounts to 3 MHz, for example. As becomes apparent from FIG. 1, the clock frequency $f_c$ and half the clock frequency $f_{c/2}$ are generated by means of a frequency generator 17 which may be a frequency-controlled crystal oscillator, for example, and a frequency divider 18. FIGS. 1a and 1b illustrate schematically the conversion of the video signal prior to recording. If the original video signal a corresponds to the period T of a single horizontal line at a bandwidth of 3 MHz (see FIG. 1a), then the converted video signal b is of the double period 2 T, i.e. only half the bandwidth, namely 1.5 MHz, is required. It will therefore be feasible either to use recording systems of lower-than-normal transmission bandwidth or to record at half the normal tape speed. Either of these advantages may be utilized thanks to the invention, especially for domestic recording of television signals. These advantages are of special significance for a magnetic tape/camera system: either reduced tape consumption or a fraction of the normal tape speed while preserving high signal resolution; or the possibility of using a recording system having only half the bandwidth. As will be gathered from the following description of the skip field or rather of the "skip line" system it is not only advantageous to record only every second line or every second field, but even to record only every fourth line or every fourth field, the resulting picture quality still being sufficiently high for domestic requirements. The recording method employed here will be briefly described with reference to FIG. 3. The first line illustrates the successive horizontal line 1–5 within the time scale of 0 to approximately 4.5 T. Below, the sync pulses corresponding to this line sequence are shown, and one line further down is shown the square wave voltage at frequency $f_{H/2}$ which may be produced from these sync signals by means of a Schmitt trigger, for example. One line further down are illustrated the switching characteristics of the switches $S_1$ and $S_2$ of FIG. 1. Within the time period 0-T, the shape of the curve of $S_1$ reads "$S_1$ closed", whereas in the case of $S_2$ the diagram for the same time period reads "$S_2$ open" (reference is also made in this connection to the switch positions shown in FIG. 1). The switching function of $S_3$ is not shown but it will be clear from FIGS. 1 and 3 that the switching characteristic of readout switch $S_3$ corresponds to the characteristics, FIG. 3, of the clock $I(f_{c/2})$ and clock $II(f_{c/2})$ pulses; that is, while clock pulse $I(f_{c/2})$ is "ON" (positive), switch $S_3$ is in its position I, and while clock pulse $II(f_{c/2})$ is "ON" (positive), switch $S_3$ is in its position II.

Depending upon the position of switches $S_1$ or $S_2$ in FIG. 1, the switch $S_3$ connects the magnetic head 19 to the storage device, I or II, the input switch, $S_1$ or $S_2$, of which is open. The clocking in and clocking out of the video lines takes place according to the diagram of FIG. 3. The numerals denoting the switched voltages $S_1$ and $S_2$ and surrounded by a circle identify those lines from among the illustrated line sequence (lines 1–5) which, during the period concerned are just being clocked into the storage device. The numerals crossed by a dotted line, on the other hand, identify those lines which have not been stored or, in other words, have been skipped. During the period 0-T, therefore, line 1 is used as a sample to be fed to the storage device I at the clock frequency $f_c$. Simultaneously therewith, a line which had become available two lines before line 1 and which is not shown here is read out at half the clock frequency $f_{c/2}$. During the next period (T–2T) line 2 is skipped in that both switches $S_1$ and $S_2$ are open which prevents this line from being fed to the storage device. The clock pulse $I(f_{c/2})$; and applied to storage device I at the frequency $f_{c/2}$ accomplishes the readout of line 1 (within the total time T–3T) and the recording of this converted video signal (see FIG. 1b) on magnetic tape. When t = 2 T while this readout operation is still in progress the signal line 3 is connected to the storage device II via the switch $S_2$, in order to be entered at clock frequency $f_c$. When the line 3 sample has been entered the readout of line 3 at half the clock frequency, as well as the recording operation commences within the time period 3 T–4 T and the readout and recording operations are terminated at time 5 T. Besides, during the 3 T–4 T time period line 4 is skipped, i.e. will not be stored. It is apparent that the write operation is immediately followed by the readout of the information just written. The sequence evolving within the time 0–4 T then continues to repeat itself, and the process need not be explained further. The required control functions for the switching operations are made available by the logic unit 11 which may be a diode circuit, for example. The record on the magnetic tape, not shown, is therefore an uninterrupted sequence of odd lines or fields, with the signal duration being doubled and the bandwidth halved.

Playback is effected in this system by the circuit shown in FIG. 2 wherein all parts denoted by a reference symbol with an apostrophe need not be duplicated in the case of a combined recording/playback unit and can be utilized for the purpose of reproduction.

In addition to the circuit shown in FIG. 1 there is provided a phase-locked loop circuit (PLL) consisting of the oscillator (VCO) 21 and the phase comparator 20. The oscillator (VCO) may advantageously be used at the same time for time base error correction, in conjunction with other known circuit elements. By means of the oscillator circuit half the clock frequency $f_{c/2}$ is generated and re-adjusted in dependence on the reproduced horizontal frequency $f_H$, and this ensures that switching of the write and readout units 21′ and 13′ only takes place when the storage devices I′ and II′ are either empty or full.

The switches $S_1'$ and $S_2'$ are controlled via the function lines 14′ and 15′, as are the stages 12′ and 13′. The switch $S_1'$ is closed when the switch $S_2'$ in open, and vice versa, by a simple switching operation as in the case of units 12′ and 13′. Via the (feedback) lines 22 and 23 the output of storage devices I′ and II′ is taken back to the respective input, so that, on stored signals being read out the signals enter the store once more and are read out a second time. Thus, as shown also in FIG. 4, the number of lines is doubled (multiplied by n) again, so that a video signal which is complete in terms of time becomes available at point A for playback purposes. An assembly 24, framed by dash dot lines, represents a further alternative circuit arrangement by means of which a likewise complete video signal can be generated at point B, using a third storage device III, a further clock generator 25 and a switching unit 26. When using this assembly 24, lines 22 and 23 may be omitted because by a changeover of switch 26 between the direct line 27 and the storage device III on the one hand and between the storage devices I′ and II′ on the other, doubling of the signal is likewise achieved.

Figure 4:
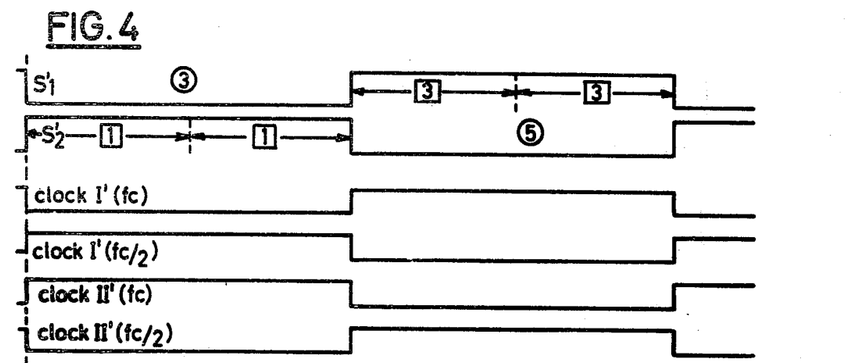
FIG. 4 a diagram showing the voltages according to FIG. 2

The playback function of the circuit arrangement shown in FIG. 2 is illustrated diagrammatically in FIG. 4 showing the voltage characteristics. In this figure a number, e.g., 3 or 5, in a circle denotes that the corresponding line is written-in during the indicated interval, namely at frequency $f_{c/2}$; and a number, e.g., 1 or 3, in a square denotes that the corresponding line is read out during the indicated interval, namely at frequency $f_c$.

Since switch $S_1'$ is closed, for instance line 3 from the magnetic tape is sampled into the storage device I′ at the clock frequency $f_{c/2}$, i.e. within two time periods (2 T). At the same time, line 1, which had already previously been read into the storage device II′ is read out twice — as explained above — from the storage device II′ at clock frequency $f_c$. Subsequently, while line 3 is read out twice from the storage device I′ at $f_c$, line 5 is read into the storage device II′ at half the clock frequency, $f_{c/2}$. The associated clock frequency characteristics have likewise been shown in the drawing, a clock frequency $f_{c/2}$ being allocated each time to a closed switch $S_1'$ or $S_2'$, and the clock frequency $f_c$ being allocated each time to an open switch $S_1'$ or $S_2'$.

Figure 5:
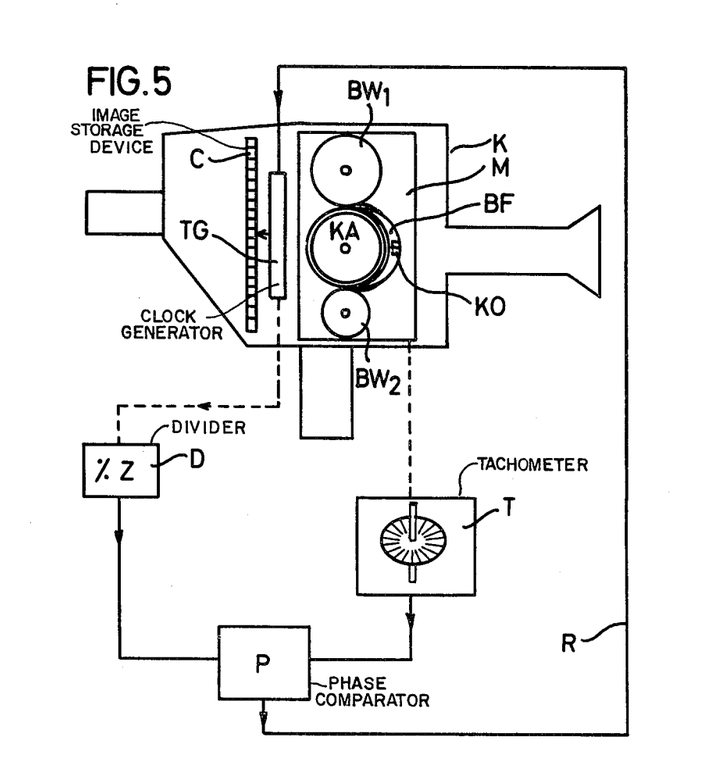
FIG. 5 in diagrammatic representation, a combined camera recording/playback system.

A record/playback system comprising a color video camera is shown diagrammatically in FIG. 5.

Such a system comprises essentially the camera K with the optical equipment which is necessary, although not shown here, the storage device or image-storing device C, which may be devised in the shape of a CCD matrix, the clock generator TG and the tape recorder drive unit M. The input/output units for the storage device C, the power supply units, the control units for the drive mechanism M and other details have not been shown here.

The tape recorder drive mechanism M operates on the contact winding principle and comprises two tape rolls BW 1 and BW 2 which share a common peripheral drive member in the shape of a capstan KA, so that the magnetic tape is transported through a tape guide BF past a magnetic head KO with which it maintains contact. Tape drives of this kind have been described, for example, in U.S. Pat. No. 3,921,933 and U.S. patent application Ser. No. 574,958, filed May 6, 1975 now U.S. Pat. No. 4,018,402.

In the embodiment described here, the drive unit is accommodated directly inside the housing of camera K. This represents a very advantageous design, made possible by the compact size of the drive mechanism. However, it would be possible to use the camera K as a unit separate from the drive mechanism which latter may also be a portable unit, and the following description should be understood to refer to portable systems in particular.

The clock generator TG is connected via a dotted line to a divider stage D, e.g. a counter such as a flip-flop, whose output is taken to a phase comparator P, e.g. a double balanced modulator (DBM). The drive mechanism M is connected by dotted line to a tachogenerator T which may of course be provided in the drive mechanism, e.g. on the drive motor of capstan KA, and the output lead of which is likewise taken to the phase comparator P. The output of phase comparator P is connected to the input of the clock generator TG.

If the maximum video frequency to be recorded is 5.5 MHz, the clock frequency $f_N$ of the clock generator TG which is preferably a commercial-type voltage-controlled oscillator (VCO) should be 11 MHz. By means of a divider D which divides by a suitable factor, e.g. Z = 700, a reduced frequency $f_i$ within the range of the line frequency ($f_H \sim 15.6$ kHz) is obtained at the phase comparator P and compared with the tacho-frequency $f_T$ which latter should correspond to the frequency $f_H$ (= $f_T$) provided the tacho-disc is suitably marked. Any frequency on phase error signal is fed, via connection R, to the clock generator TG (VCO) in the shape of a differential voltage, the said clock generator adjusting its clock frequency $f_N$ to the new voltage. In this way, continuous control is achieved which makes at least part of the otherwise required time base error correction system (TBEC) superfluous. Thus, immediate reproduction of the recorded video information becomes possible, for example by means of a monitor which is either attached to the camera or connectible thereto. If the recorded information is played back on a television receiver a supplementary electronic unit between camera and television receiver will be required. The advantage is, at any rate, that a readout of video signals from the storage device C is obtained which has been adapted to the actual tape speed fluctuations of the drive mechanism such that each of the picture samples (e.g. a horizontal line) derived from the store occupies the same length on the magnetic tape upon being recorded. This amounts to a very far-reaching compensation of the time base errors caused by the drive mechanism. Other time base error correction measures required for a completely faultless reproduction may still be used in addition.

In the tape recorder M the magnetic head KO which may be a read/write head used for recording as well as playback is a stationary head, and the tape is transported past this head and in contact therewith. The head writes video information on the tape on longitudinal tracks. When the end of the tape is reached the changeover of the running direction of the tape is accompanied by a simultaneous change in the level of the magnetic head for the purpose of writing on the next track which is parallel to the first. The reversal requires a major part of the total energy used for the tape-running operation. As has already been explained earlier it is of great advantage in a camera system to reduce the tape speed required for recording and playback to a minimum.

This can be achieved, for example, by halving or dividing by three the standard speed of 4 m/s if the information stored in the storage device, e.g. a CCD is read out at half or one third of the clock frequency or if a less powerful resolution is tolerated during playback.

With respect to a reversal at the end of each track on the magnetic tape, dividing the standard speed by two or by three means, according to the equation $E_{rot} = \frac{1}{2} \theta \omega^2$ wherein $E_{rot}$ = rotational energy
$\theta$ = moment of inertia  } of the rotating mass
$\omega$ = angular velocity a reduction of the energy requirement needed at normal speed to one fourth and one ninth, respectively. The number of batteries in portable equipment being limited in any case, it is now possible to reduce the energy requirement by reducing tape speed while maintaining the same period of reversal — or to increase the record/playback capacity while using the same amount of energy from the batteries.

It would also be possible to reduce the reversal period which is 400 ms in battery-fed equipment, for example, as against 80 ms in mains-operated equipment to one quarter, i.e. 100 ms by reducing the tape speed to one half. With an optimum layout even the 80 ms reversal period of the mains-operated equipment might be achieved, so that full compatibility is obtained. Another possibility would be to supply the energy required by a reduced tape speed manually when a long reversal period, i.e. 400 ms or greater is adhered to, so that only a small battery will be required to maintain normal tape speed between reversals.

The embodiments of the system of the invention as described and illustrated here are schematic representation of the circuit diagrams involved. Details of the required circuit elements and their dimensions will be known to those skilled in the art. Modifications of the embodiments of the invention are feasible without departing from the scope of the appended claims.

We claim:

1. A record/playback system for color video signals in which only every $n^{th}$ partial picture is sampled to obtain a picture sample signal and recorded on magnetic tape, and the recorded picture sample signals are scanned n times at clock frequency for reproduction, said system comprising:
   electronic signal storage apparatus;
   means for writing, prior to recording, every $n^{th}$ picture sample signal into said signal storage apparatus at clock frequency for storage therein for the duration of said picture sample signal while skipping the picture sample signals between said nth signals; and
   means for reading out of said storage apparatus, and recording, the stored picture sample signals, at $1/n^{th}$ of the clock frequency.

2. A system according to claim 1, wherein said picture sample signal is one horizontal line.

3. A system according to claim 1, wherein said picture sample signal is one field.

4. A system according to claim 1 wherein n equals 2.

5. A system according to claim 1, wherein n equals 4.

6. A system according to claim 1,
   wherein said system further comprises a magnetic taper recorder with transducer means for scanning the magnetic tape in recording and playback, as well as write-in and readout switching means, clock pulse generator means, clock pulse control switches and control logic means; and
   wherein said electronic signal storage apparatus includes two electronic signal storage devices.

7. A system according to claim 6,
   wherein, in recording, said write-in switching means are interposed between the received color video signal path and said storage devices, said read-out switching means are interposed between said storage devices and said transducer means, and said control logic means are connected to said received signal path; and
   wherein said control logic means includes frequency dividing means for producing pulse sequences controlling said write-in switches, said read-out switches and said clock pulse control switches in synchronized relationship to the received color video signals;
   said write-in switches and said clock pulse control switches being responsive to said pulse sequences to cause every $n^{th}$ picture sample signal to be written alternately into said two storage devices at the clock frequency produced by said generator means, the picture samples between said $n^{th}$ signals being skipped; and
   said read-out switches and said clock pulse control switches being responsive to said pulse sequences to cause the stored picture sample signals to be read alternately out of said two storage devices at $1/n^{th}$ the clock frequency produced by said generator means, with any write-in operation into a predetermined one of said storage devices being followed by a read operation out of said same storage device.

8. A system according to claim 6,
   wherein, in playback, said write-in switching means are interposed between said transducer means and said storage devices, said read-out switching means are interposed between said storage devices and an output terminal, and said control logic means are connected to said transducer means; and wherein said control logic means include frequency dividing means for producing pulse sequences controlling said write-in switches, said read-out switches and said clock pulse control switches in synchronized relationship to the recorded color video signals as reproduced by said transducer means;

said write-in switches and said clock pulse control switches being responsive to the pulse sequences produced by the last-mentioned frequency dividing means to cause the reproduced picture sample signals to be written alternately into said two storage devices at $1/n^{th}$ the clock frequency produced by said generator means; and said read-out switches and clock pulse control switches being responsive to the pulse sequences produced by the last-mentioned frequency dividing means to cause, simultaneously with the writing of said reproduced picture sample signals into one of said storage devices, the picture sample signals stored in the other storage device to be read, twice in succession, out of the last-mentioned storage device at the clock frequency produced by said generator means, for application to said output terminal.

9. A system according to claim 8, wherein, for the purpose of reading the recorded and reproduced picture sample signals as stored in the signal storage devices out twice on playback, a feedback line is provided around each of said two storage devices.

10. A system according to claim 8, wherein for the purpose of reading the recorded and reproduced picture sample signals are stored in the signal storage devices out twice on playback, there are provided a third signal storage device, a feedback line around said third storage device, and further switching means for changing over the signal path between one of the two first-mentioned signal storage devices on the one hand, and the third signal storage device and the last-mentioned feedback line on the other hand.

11. A system according to claim 8, wherein said clock generator means comprises a phase locked loop circuit for locking said $1/n^{th}$ clock frequency into synchronized relationship to the color video signals reproduced by said transducer means.

12. A record/playback system for a color video camera in which system video signals are stored at least for the duration of a horizontal line, said video signals being part of a color video picture in which the number of lines is reduced by comparison with the number of lines of the employed color television standard, said system comprising:

an electronic signal storage device;

means for writing, prior to recording on magnetic tape, every nth picture sample signal into said storage device at clock frequency for storage therein at least for the duration of one horizontal line while the picture sample signals between said nth signals are skipped;

means for reading the stored picture sample signals out of said storage device at $1/n^{th}$ the clock frequency for recording; and means for reproducing the picture sample signals recorded on said tape n times in playback.

13. A system according to claim 12, wherein the electronic signal storage device has a capacity of one horizontal line.

14. A system according to claim 12, wherein the electronic signal storage device has a capacity of one field.

15. A system according to claim 12, said system also comprising means for correcting said clock frequency in accordance with tape speed fluctuations.

16. A system according to claim 15, wherein said correcting means include a tachometer monitoring the tape speed;

clock generator means connected to the readout side of said signal storage device; and comparison means connected both to said tachometer and said clock generator means to develop an error signal voltage for correcting the clock frequency produced by said clock generator means, in accordance with said tape speed fluctuations.

* * * * *

UNITED STATES PATENT AND TRADEMARK OFFICE
CERTIFICATE OF CORRECTION

PATENT NO. : 4,133,009
DATED : January 2, 1979
INVENTOR(S) : Wolfram Kittler et al It is certified that error appears in the above-identified patent and that said Letters Patent are hereby corrected as shown below:

Claim 10, line 3, "are stored" should read --- as stored ---.

Signed and Sealed this

Twenty-seventh Day of November 1979

[SEAL]

Attest:

RUTH C. MASON
Attesting Officer

LUTRELLE F. PARKER
Acting Commissioner of Patents and Trademarks